(12) United States Patent
Zhu

(10) Patent No.: US 12,268,331 B2
(45) Date of Patent: Apr. 8, 2025

(54) SILICON NITRIDE CERAMIC HEATING AND IGNITION DEVICE FOR GRANULAR FUEL BARBECUE OVEN

(71) Applicant: Shirong Zhu, Shanghai (CN)

(72) Inventor: Shirong Zhu, Shanghai (CN)

(*) Notice: Subject to any disclaimer, the term of this patent is extended or adjusted under 35 U.S.C. 154(b) by 639 days.

(21) Appl. No.: 17/588,177

(22) Filed: Jan. 28, 2022

(65) Prior Publication Data

US 2023/0165403 A1  Jun. 1, 2023

(30) Foreign Application Priority Data

Nov. 29, 2021  (CN) ........................... 2021114325117

(51) Int. Cl.
| | | |
|---|---|---|
| *A47J 37/07* | (2006.01) |
| *F24B 13/02* | (2006.01) |
| *F24B 13/04* | (2006.01) |
| *F24B 15/00* | (2006.01) |
| *F24C 15/32* | (2006.01) |

(52) U.S. Cl.
CPC ....... *A47J 37/0709* (2013.01); *A47J 37/0786* (2013.01); *F24B 13/02* (2013.01); *F24B 13/04* (2013.01); *F24B 15/005* (2013.01); *F24C 15/325* (2013.01)

(58) Field of Classification Search
CPC .. A47J 37/0709; A47J 37/0786; A47J 37/079; F24B 13/02; F24B 15/005; F23Q 7/02; Y02A 40/928

USPC ........................................................ 126/25 R
See application file for complete search history.

(56) References Cited

U.S. PATENT DOCUMENTS

| | | | | |
|---|---|---|---|---|
| 5,044,266 A | * | 9/1991 | Geogaris | A47J 37/0786 |
| | | | | 99/446 |
| 2022/0252266 A1 | * | 8/2022 | Planer | F23Q 3/008 |

FOREIGN PATENT DOCUMENTS

| | | | | | |
|---|---|---|---|---|---|
| CN | 206958967 U | * | 2/2018 | | |
| CN | 109363526 A | * | 2/2019 | | A47J 37/0704 |
| CN | 110260358 A | * | 9/2019 | | F23Q 1/06 |
| CN | 110916530 B | * | 3/2021 | | |
| CN | 214094586 U | * | 8/2021 | | |
| CN | 113432114 A | * | 9/2021 | | |

\* cited by examiner

*Primary Examiner* — Allen R. B. Schult
*Assistant Examiner* — William C Weinert
(74) *Attorney, Agent, or Firm* — Jeenam Park

(57) ABSTRACT

The present disclosure provides a silicon nitride ceramic heating and ignition device for a granular fuel barbecue oven, including a combustion chamber and a fixing pipe. An outer wall of the combustion chamber is welded to one end of the fixing pipe, the fixing pipe is communicated with an interior of the combustion chamber, and air inlet holes and air flow holes are defined in the two sides of the fixing pipe. One end of the fixing pipe is fixedly connected with a stainless steel sheet bending support, and the heat dissipation ceramic flange sleeve and one end flange port of the fixing pipe are connected with a boss positioning center. An inner cavity of the heat dissipation flange ceramic sleeve is bonded with the silicon nitride ignition rod.

8 Claims, 11 Drawing Sheets

SILICON NITRIDE CERAMIC HEATING AND IGNITION DEVICE FOR GRANULAR FUEL BARBECUE OVEN

TECHNICAL FIELD

The present disclosure relates to a field of heating devices, and in particular to a silicon nitride ceramic heating and ignition device for a granular fuel barbecue oven.

BACKGROUND

A silicon nitride ceramic heating and ignition device for a granular fuel barbecue oven is a heating and ignition device configured to grill food and heat stoves in cold areas in winter by igniting biomass particles for combustion.

An ignition device for a granular fuel barbecue oven is generally configured to heat and ignite the biomass particles by adopting a stainless steel ignition rod. Due to limitations of heating efficiency and processing technology, the stainless steel ignition rod has defects of low temperature, non-uniform temperature of a heating area, and slow heating speed, so that ignition time of the barbecue oven is long, and even multiple times of ignition is required. In order to achieve normal ignition effect, power of the ignition rod exceeds a normal range, and service life of the ignition rod is shortened. What is more, sealing performance and insulation performance of the ignition rod cannot meet requirements, so that barbecue ovens stored in a humid environment or stored outdoors cause dangers of short circuit of internal heating materials and electric leakage of a shell. An ignition rod shell and a combustion chamber are made of stainless steel, the ignition rod shell may be oxidized under high temperature after being used for a short time, and the ignition rod shell is connected with the combustion chamber and cannot be disassembled, which is difficult to replace the ignition rod, and may damage a structure of the ignition device, thereby causing economic loss and life safety.

SUMMARY

The present disclosure aims to overcome defects in prior art, and provides a silicon nitride ceramic heating and ignition device for granular fuel barbecue oven.

In order to achieve the above purpose, the present disclosure adopts following technical schemes:

A silicon nitride ceramic heating and ignition device for granular fuel barbecue oven, including a combustion chamber and a fixing pipe. An outer wall of the combustion chamber and a first end of the fixing pipe are fixed together as a whole. The fixing pipe is communicated with an interior of the combustion chamber to form a heat flow channel. A flange port of a second end, distal from the combustion chamber, of the fixing pipe is connected with a heat dissipation ceramic connection sleeve and a heat dissipation flange ceramic sleeve assembly. A heat dissipation ceramic flange sleeve of a first end of the heat dissipation flange ceramic sleeve assembly and the flange port of the second end of the fixing pipe are connected with a boss positioning center. A silicon nitride ignition rod is bonded to an inner wall of a second end of the heat dissipation flange ceramic sleeve assembly. A wiring end of the silicon nitride ignition rod are connected to two lead-out wires. The two lead-out wires penetrate through wire passing holes of the heat dissipation flange ceramic sleeve. Heat dissipation through holes are defined between the silicon nitride ignition rod, the heat dissipation flange ceramic sleeve assembly, and the fixing pipe. One end of the silicon nitride ignition rod extends into an interior of the combustion chamber. The heat dissipation flange ceramic sleeve and the flange port are fixed on a stainless steel sheet bending support through fixing screws.

Specifically, the silicon nitride ignition rod uses a special formula of silicon nitride powder to press a heating molybdenum wire material into the silicon nitride ignition rod. Under a vacuum high-pressure state, the heating molybdenum wire material and silicon nitride are directly sintered into a whole through a high temperature of 1780 degrees Celsius, so that the silicon nitride ignition rod has excellent thermal conductivity, oxidation resistance, electrical insulation performance in a high-temperature state, low thermal expansion coefficient, and corrosion resistance of acid, alkali, and salt. The silicon nitride ignition rod has advantages of maintaining strength of room temperature at 1200 degrees Celsius, etc. Heating power of the silicon nitride ignition rod may be set higher, and the good thermal conductivity effectively increases ignition temperature and shortens ignition time. In addition, the silicon nitride ignition rod is well fixed inside the heat dissipation flange ceramic sleeve pipe, which avoids the silicon nitride ignition rod from excessively shaking and non-positioning, and further improves service life of the silicon nitride ignition rod.

Specifically, the silicon nitride ignition rod is well fixed in a middle of an inner part of the heat dissipation flange ceramic sleeve pipe, which avoids the silicon nitride ignition rod from excessively shaking and non-positioning, and further improves service life of the silicon nitride ignition rod. A sealing performance of the heating molybdenum wire element and the silicon nitride in the silicon nitride ignition rod after sintering through a vacuum high-pressure technology is further improved, so that the silicon nitride ignition rod may be stored in a humid environment or stored outdoors. Good corrosion resistance of acid, alkali, and salt enables the silicon nitride ignition rod to bare corrosion of oil, salt, and various organic substances produced by food during grilling, and the silicon nitride ignition rod is easier to clean.

Furthermore, the lead-out wires are respectively welded to the two lead welding ends of the silicon nitride ignition rod. The lead-out wires are welded to two side ends of a U groove defined in the silicon nitride ignition rod. A first isolation sheet is disposed in a middle of an inner side of the heat dissipation flange ceramic sleeve to form a fixed isolation area. A wall body of the isolation sheet is matched and connected with a wall of the U groove of the silicon nitride ignition rod. And the lead-out wires penetrate through the heat dissipation flange ceramic sleeve and extend to an exterior of the heat dissipation flange ceramic sleeve.

The two lead-out wires are separated by the first isolation sheet, so that the two lead-out wires are not come into contact with each other in the heat dissipation flange ceramic sleeve, which improves the insulation performance of the device and ensures safety of equipment and people.

Specifically, when an outer wall of the U groove at one end of the silicon nitride ignition rod body and the first isolation sheet in the inner wall of the heat dissipation flange ceramic sleeve are bonded through a high-temperature homogeneous solid adhesive, the solid adhesive may be filled in a gap between the heat dissipation flange ceramic sleeve and the U groove at one end of the silicon nitride ignition rod body, so that the solid adhesive flows to an interior of a positioning groove when the solid adhesive flows to the U groove under pre-pressure, and the solid adhesive may be attached and bonded. When the solid adhesive is solidified, liquid becomes solid, a distance between molecules is reduced, attraction force between the molecules increases, and the gap between the U groove at one end of the silicon nitride ignition rod body and the interior of the positioning groove of the heat dissipation flange ceramic sleeve is filled. When the solid adhesive is solidified, no gap exists, no sealing or sticking is caused, so that excellent sealing performance between the heat dissipation flange ceramic sleeve and the silicon nitride ignition rod body is achieved, and products may be stored in the humid environment or stored outdoors.

Furthermore, a positioning groove and a second isolation sheet are defined in a middle of an inner wall of the heat dissipation flange ceramic sleeve. An upper end and a lower end of the positioning groove are configured to position a body of the silicon nitride ignition rod. An inner wall of the U groove of the silicon nitride ignition rod is inserted into the isolation sheet to locate and isolate the lead-out wires.

Furthermore, semi-circular bodies at two ends of the silicon nitride ignition rod penetrate through convex bodies of the lead-out wires.

Furthermore, the isolation sheet is inserted into the positioning groove disposed in the inner wall of the heat dissipation flange ceramic sleeve and abuts against the U groove at one end of the silicon nitride ignition rod, so that space inside the heat dissipation flange ceramic sleeve is divided into two parts, the two lead-out wires are respectively located in two different spaces, and the insulation performance is further improved.

Furthermore, the inner wall of the heat dissipation flange ceramic sleeve is bonded with the silicon nitride ignition rod through the high-temperature homogeneous solid adhesive, which is configured to fill a gap between the heat dissipation flange ceramic sleeve and the silicon nitride ignition rod.

Specifically, when the inner wall of the heat dissipation flange ceramic sleeve and the silicon nitride ignition rod are bonded through the high-temperature homogeneous solid adhesive, the solid adhesive may be filled in the gap between the heat dissipation flange ceramic sleeve and the silicon nitride ignition rod, so that excess solid adhesive of the U groove of the heat dissipation flange ceramic sleeve flows into other grooves under pressure, and the solid adhesive may be attached and filled in other inner cavities. When the solid adhesive is solidified, liquid becomes solid, a distance between molecules is reduced, attraction force between the molecules increases, and the gap between the heat dissipation flange ceramic sleeve and the silicon nitride ignition rod is filled. When the solid adhesive is solidified, no gap exists, no sealing or sticking is caused, so that the excellent sealing performance between the heat dissipation flange ceramic sleeve and the silicon nitride ignition rod is achieved, the products may be stored in the outdoor and humid environment, and a structure may be provided to smooth out when the solid adhesive fills up the port and overflows.

Furthermore, threaded holes are defined at two positions of the flange port of one end of the fixing pipe where the two positions are at 90 degrees to each other. An inner cavity wall of a connecting head is matched and positioned with two symmetrically distributed concave-convex boss sliding grooves of ends of the heat dissipation flange ceramic sleeve assembly. The connecting head is fixed with the stainless steel sheet bending support through a fixing screw. An outer wall of the fixing screw is compressed on the stainless steel sheet bending support.

Furthermore, an adjustable waist hole is fixedly connected to the stainless steel sheet bending support, which may increase an adjustable range under condition of micro-shape changes.

Specifically, when the fixing screw is screwed, a waist hole is defined on the stainless steel sheet bending support to adjust. After the fixing screw is screwed tightly with the stainless steel sheet bending support, the screw does not contact the ceramic part of the inner cavity of the heat dissipation flange ceramic sleeve assembly, the stainless steel sheet bending support is not moving, and the ceramic component may fluctuate in a trace manner. The silicon nitride ignition rod in slight deformation is adjusted through the waist hole of the stainless steel sheet bending support. The silicon nitride ignition rod is fixed at one inner end of the heat dissipation flange ceramic sleeve, the heat dissipation flange ceramic sleeve body is fixed through the boss at another end, and an outside of the heat dissipation flange ceramic sleeve is fixed through the flange, which may prevent shaking of the silicon nitride ignition rod solve a contact problem of the ignition rod and the stainless steel consolidation, and facilitate a replacement of the ignition rod. Meanwhile, the stainless steel sheet bending support is of a waist hole-shaped sheet bending structure, is attached to an outer surface of the heat dissipation flange ceramic sleeve in a circular manner. The contact surface area of the stainless steel sheet bending support and the heat dissipation flange ceramic sleeve is large, so that a stress area of the heat dissipation flange ceramic sleeve is large, therefore, when the silicon nitride ignition rod is fixed, the brittle flange ceramic sleeve is prevented from being damaged.

Specifically, when the fixing screw is screwed, a left-right movement of the waist-shaped groove of the stainless steel sheet bending support may adjust elastic force of the heat dissipation flange ceramic sleeve assembly. During thermal expansion, a coefficient of the stainless steel sheet bending support is larger than the coefficient of the heat dissipation flange ceramic sleeve assembly, so that the stainless steel sheet bending support may not squeeze the heat dissipation flange ceramic sleeve assembly. Through the slight deformation of the heat dissipation flange ceramic sleeve, the internal silicon nitride ignition rod is not affected, and the connection boss of the heat dissipation flange ceramic sleeve is in butt joint with a flange port on the fixing pipe of the granular fuel barbecue oven to fix the silicon nitride ignition rod. Due to a fact that the silicon nitride ignition rod, the heat dissipation ceramic connecting sleeve, and the heat dissipation flange ceramic sleeve are all provided with fixing grooves and boss structure, which may well prevent the shaking of the silicon nitride ignition rod, solve the problem of the solidification of the ignition rod and the stainless steel, and facilitate the replacement of the ignition rod.

Due to an arrangement of the fixing connection of the stainless steel sheet bending support, the silicon nitride ignition rod and the heat dissipation flange ceramic sleeve assembly may be kept unchanged during stress and heating, so that the stainless steel sheet bending support always surrounds the heat dissipation flange ceramic sleeve assembly at a large area all the time, and damage of the silicon nitride ignition rod heat dissipation flange ceramic sleeve assembly is further avoided.

Specifically, by arranging concave-convex structure of the heat dissipation flange ceramic sleeve and the heat dissipation ceramic connecting sleeve, the heat dissipation flange ceramic sleeve is attached to the inner and outer end surfaces of the heat dissipation connection sleeve. The contact surface area of the concave-convex structure in the heat dissipation flange ceramic sleeve is large, so that the heat dissipation ceramic connecting sleeve has the large stress area, and therefore, when the silicon nitride ignition rod is fixed, damage of the brittle heat dissipation ceramic connecting sleeve is further avoided.

Furthermore, the heat dissipation flange ceramic sleeve and a flange small end of the heat dissipation ceramic connecting sleeve are configured to fix and connect the stainless steel sheet bending support. A positioning protrusion part of a flange large end is connected with an inner hole of the flange port of one end of the fixing pipe to combine into a whole.

Specifically, the flange of the outer surface of the heat dissipation ceramic connection sleeve and the heat dissipation flange ceramic sleeve assembly flows from two air inlet holes to an inner cavity air circulation hole, so that airflow is rapidly flowing and surface heat dissipation area is increased, heat source is conveyed to the combustion chamber more quickly under continuous conveying of conveying gas of an equipment conveying blower, the lead-out wires are in a good working environment, and service life of the lead-out wires is prolonged.

Furthermore, a flange part of an outer surface of the heat dissipation flange ceramic sleeve assembly and the two heat dissipation through holes increase a heat dissipation area of the outer surface of the heat dissipation flange ceramic sleeve assembly, a hot air flow is rapidly pushed to the combustion chamber through the two heat dissipation through holes, so that the lead-out wires are in the good working environment, and the service life of the lead-out wires is prolonged.

By adopting the technical schemes of the present disclosure, beneficial effects of the present disclosure are as follows:

1. In the present disclosure, under the vacuum high-pressure state, the heating molybdenum wire material and silicon nitride are directly sintered into a whole through the high temperature of 1780 degrees Celsius, so that the silicon nitride ignition rod has excellent thermal conductivity, oxidation resistance, electrical insulation performance in the high-temperature state, low thermal expansion coefficient, and corrosion resistance of acid, alkali and salt. The silicon nitride ignition rod has the advantages of maintaining strength of room temperature at 1200 degrees Celsius, etc. Heating power of the silicon nitride ignition rod may be set higher, and the good thermal conductivity effectively increases ignition temperature and shortens ignition time. The flange part of an outer surface of the heat dissipation flange ceramic sleeve assembly and the two heat dissipation through holes promote rapid flowing air flow, the surface heat dissipation area is increased, the heat source is conveyed to the combustion chamber more quickly under continuous conveying of the conveying gas of the equipment conveying blower, the lead-out wires are in the good working environment, and the service life of the lead-out wires is prolonged. The sealing performance of the heating element and the silicon nitride in the silicon nitride ignition rod after sintering is further improved, so that the silicon nitride ignition rod may be stored in the outdoor and humid environment. The good corrosion resistance of acid, alkali and salt enables the silicon nitride ignition rod to withstand corrosion of oil, salt and various organic substances produced by food during grilling, and the silicon nitride ignition rod is easier to clean.

2. By arranging the isolation sheet in the present disclosure, the two lead-out wires are separated by the isolation sheet, so that the two lead-out wires are not in contact with each other, so that the insulation performance of the device is improved. The U groove end of the silicon nitride ignition rod is inserted into a position of the isolation sheet along the positioning groove in the upper and lower wall of the heat dissipation flange ceramic sleeve during installation, and the isolation sheet abuts against the U groove at one end of the silicon nitride ignition rod, so that space inside the heat dissipation flange ceramic sleeve is divided into two parts, the two lead-out wires are respectively located in two different spaces, and the insulation performance is further improved.

3. By arranging the positioning grooves of the upper and the lower wall of the heat dissipation flange ceramic sleeve in the present disclosure, when the outer wall of the U groove end of the silicon nitride ignition rod and the inner wall of the heat dissipation flange ceramic sleeve are bonded through the high-temperature homogeneous solid adhesive, the solid adhesive may be filled in the gap between the silicon nitride ignition rod and the inner cavity of the heat dissipation flange ceramic sleeve. In this way, when the solid adhesive is squeezed into the grooves, the solid adhesive may flow into internal voids of the grooves, and the solid adhesive may adhere to and fill the cavity. When the solid adhesive is solidified, liquid becomes solid, the distance between the molecules is reduced, the attraction force between the molecules increases, and the gap between the U groove at one end of the silicon nitride ignition rod body and the interior of the positioning groove of the heat dissipation flange ceramic sleeve is filled. When the solid adhesive is solidified, no gap exists, no sealing or sticking is caused, so that excellent sealing performance between the heat dissipation flange ceramic sleeve and the silicon nitride ignition rod body is achieved, and products may be stored in the outdoor and humid environment. In addition, the arranged connecting groove may overflow from the connecting port after being filled with the solid adhesive, so that the solid adhesive may be cleaned and smoothed.

4. By arranging respective two heat dissipation through holes of the heat dissipation ceramic connection sleeve and the heat dissipation flange ceramic sleeve in the present disclosure, a tank body forms an airflow channel hole communicating up and down. The two heat dissipation through holes of the inner cavity of the heat dissipation ceramic connection sleeve and the heat dissipation flange ceramic sleeve, in conjunction with the air inlet holes and the airflow channel hole on the fixing pipe, may more quickly transport the hot air flow generated by the silicon nitride ignition rod to the tank combustion body under an action of an air supply structure of the device. The hot air flow is quickly pushed to the combustion chamber through the two heat dissipation through holes, and the lead-out wires are in a better working environment, which improves heating and combustion speed and prolongs the service life.

5. By arranging the stainless steel sheet bending support in the present disclosure, when the fixing screw is screwed, a left-right movement of the waist-shaped groove of the stainless steel sheet bending support may adjust elastic force of the heat dissipation flange ceramic sleeve assembly. During thermal expansion, a coefficient of the stainless steel sheet bending support is larger than the coefficient of the heat dissipation flange ceramic sleeve assembly, so that the stainless steel sheet bending support may not squeeze the heat dissipation flange ceramic sleeve assembly. Then the internal silicon nitride ignition rod is pressed tightly through slight deformation of the heat dissipation flange ceramic sleeve assembly, and the silicon nitride ignition rod is fixed. Due to the fact that the silicon nitride ignition rod and the heat dissipation flange ceramic sleeve are both provided with groove structures for fixing the grooves, which may well prevent the shaking of the silicon nitride ignition rod, solve the problem of the solidification of the ignition rod and the stainless steel, and facilitate the replacement of the ignition rod.

Figure 1:
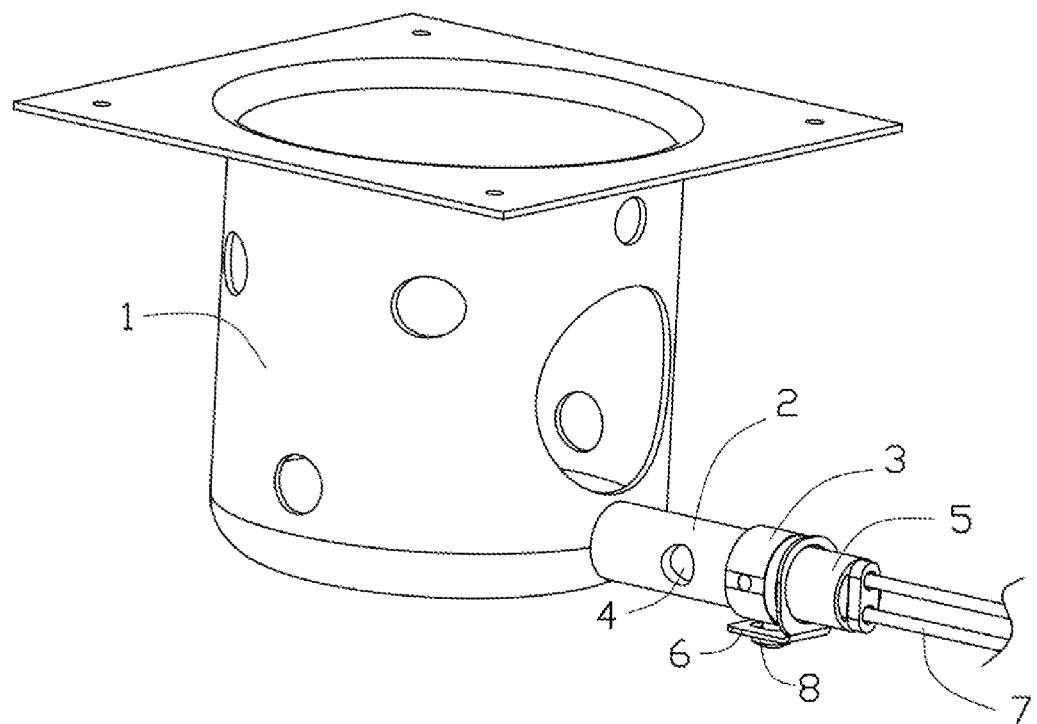
FIG. 1 is a structural schematic diagram of a 110 V silicon nitride ceramic heating and ignition device for granular fuel barbecue oven according to the present disclosure.
Figure 2:
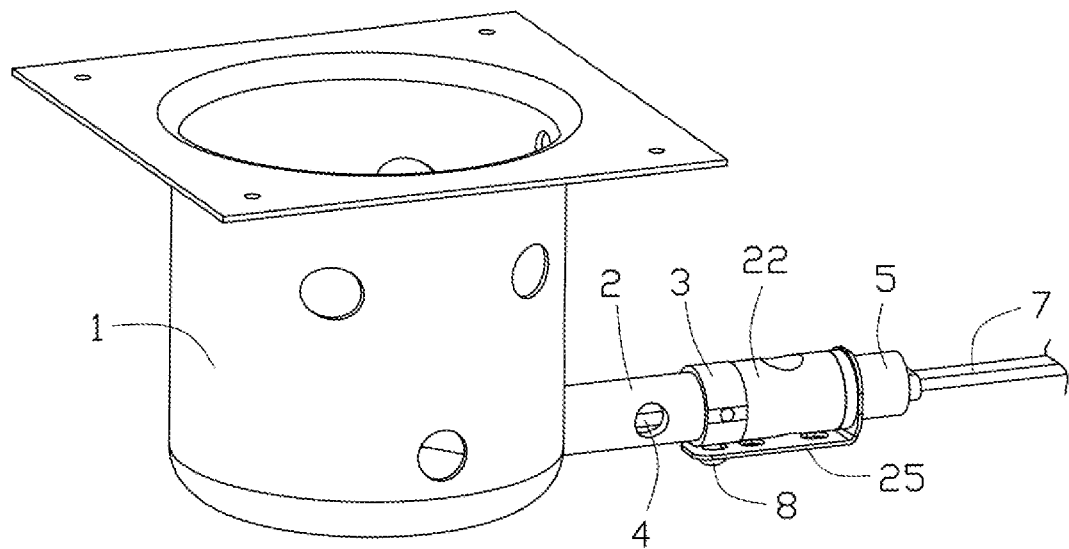
FIG. 2 is a structural schematic diagram of a 230 V silicon nitride ceramic heating and ignition device for granular fuel barbecue oven according to the present disclosure.
Figure 3:
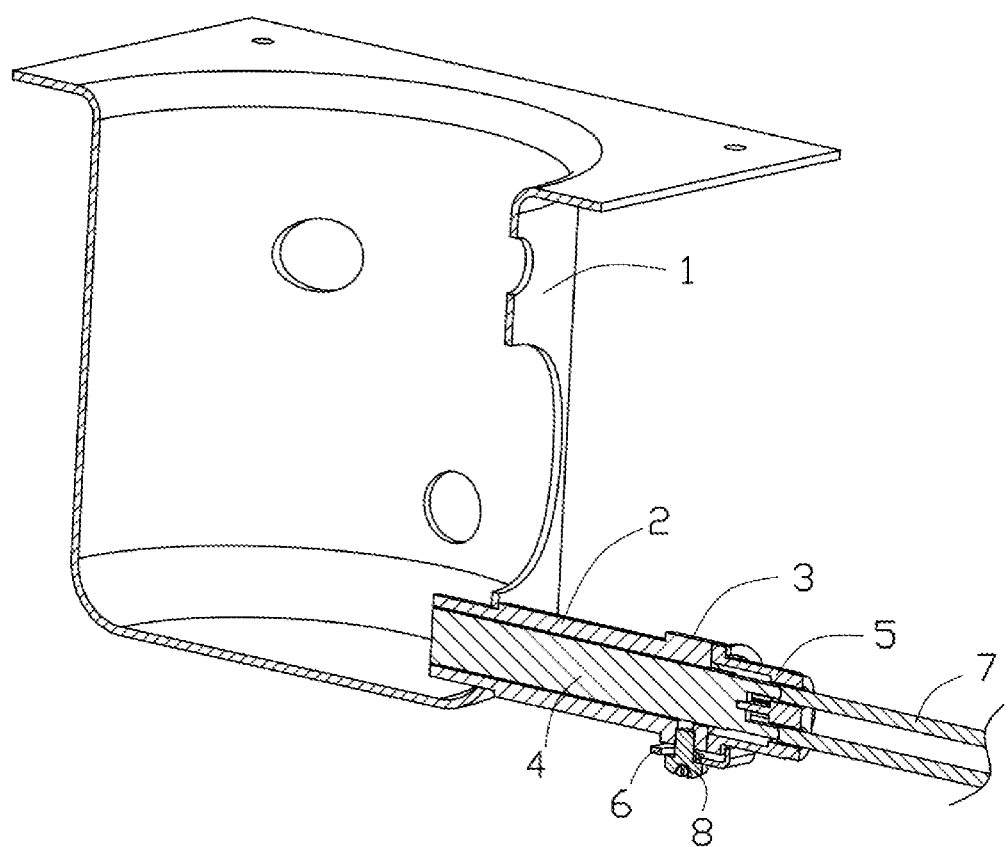
FIG. 3 is a cross-sectional structural schematic diagram of FIG. 1.
Figure 4:
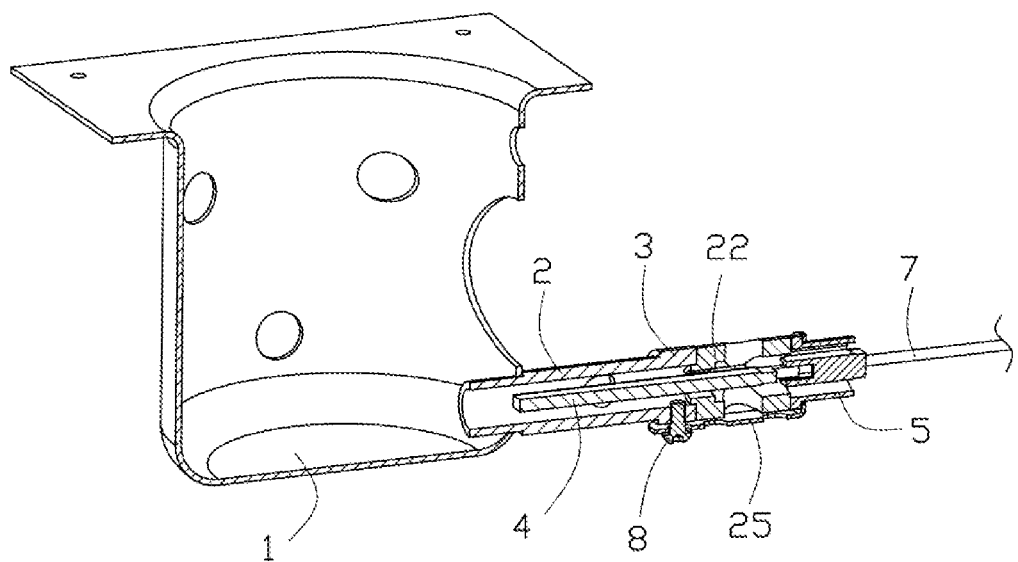
FIG. 4 is a cross-sectional structural schematic diagram of FIG. 2.
Figure 5:
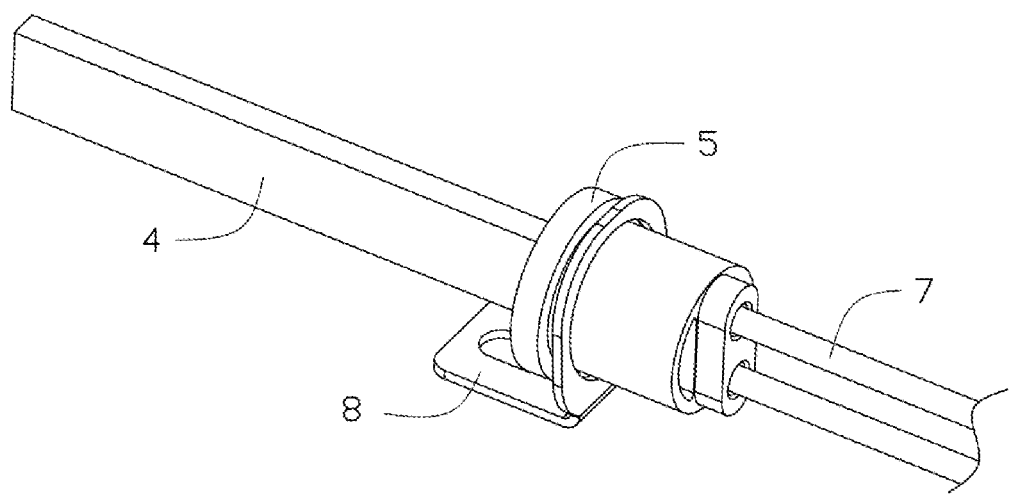
FIG. 5 is a structural schematic diagram of a middle heat dissipation flange ceramic sleeve assembly of a 110 V silicon nitride ceramic heating and ignition device for granular fuel barbecue oven according to the present disclosure.
Figure 6:
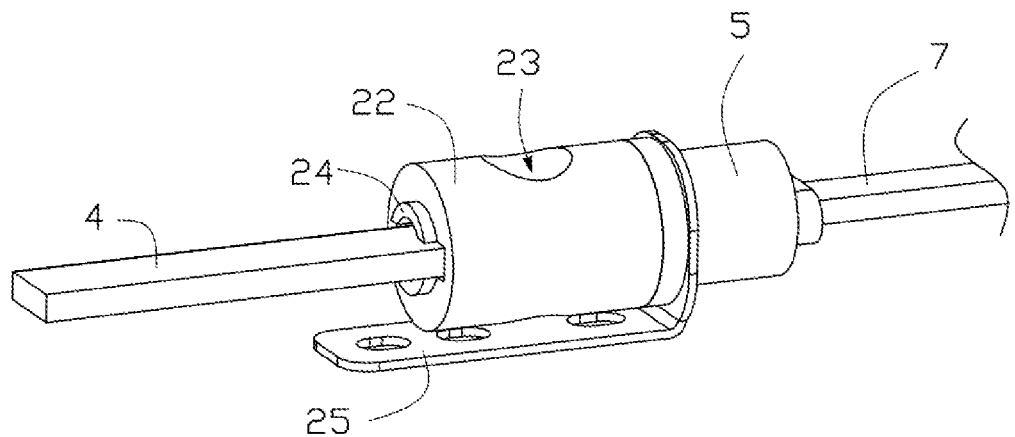
FIG. 6 is a structural schematic diagram of a middle heat dissipation flange ceramic sleeve assembly of a 230 V silicon nitride ceramic heating and ignition device for granular fuel barbecue oven according to the present disclosure.
Figure 7:
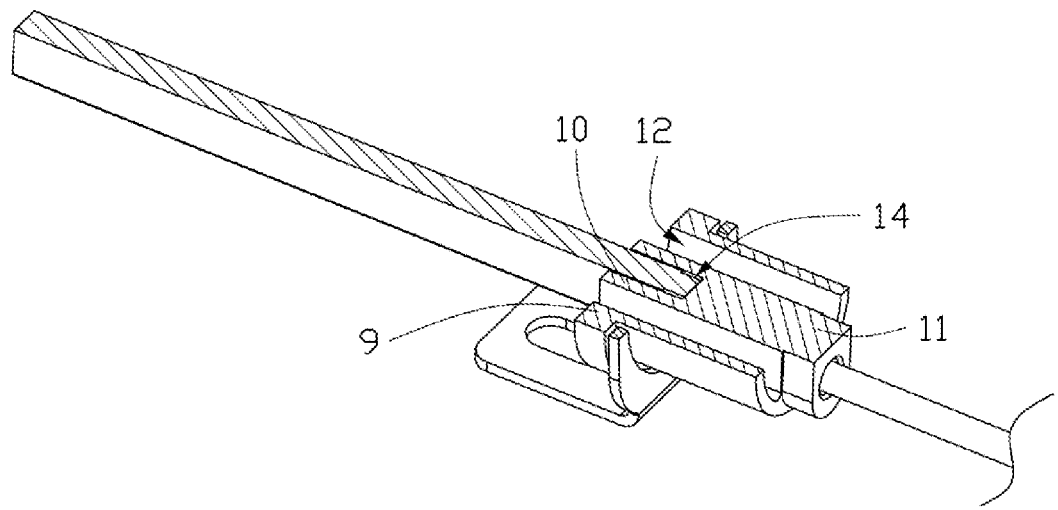
FIG. 7 is a cross-sectional structural schematic diagram of FIG. 5.
Figure 8:
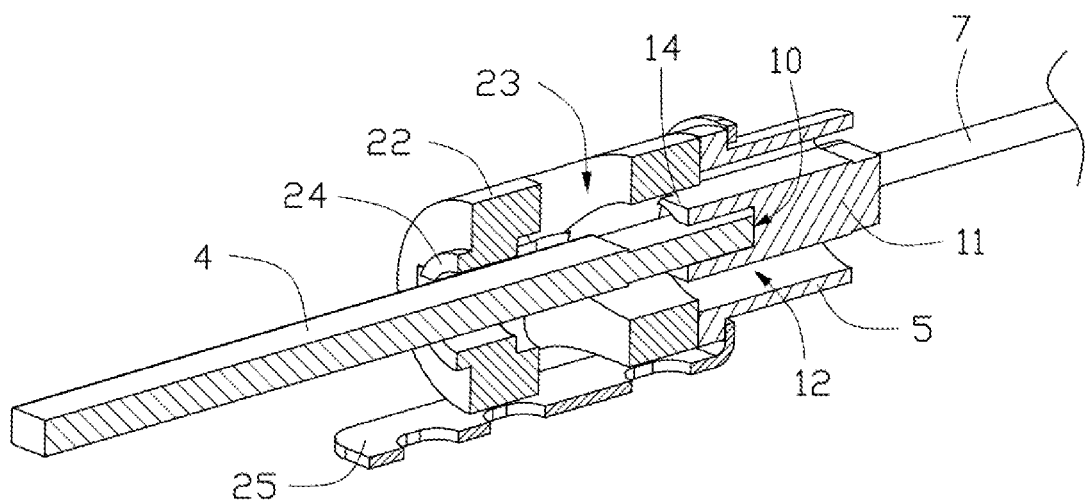
FIG. 8 is a cross-sectional structural schematic diagram of FIG. 6.
Figure 9:
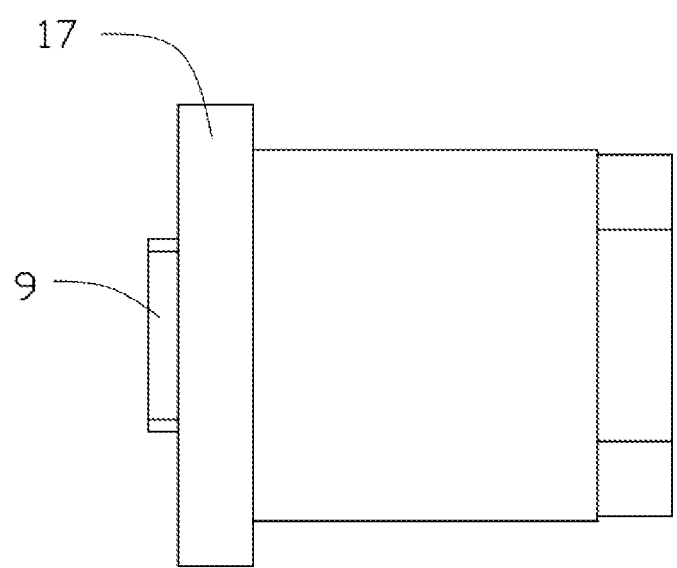
FIG. 9 is a structural schematic diagram of a heat dissipation flange ceramic sleeve of a silicon nitride ceramic heating and ignition device for granular fuel barbecue oven according to the present disclosure.
Figure 10:
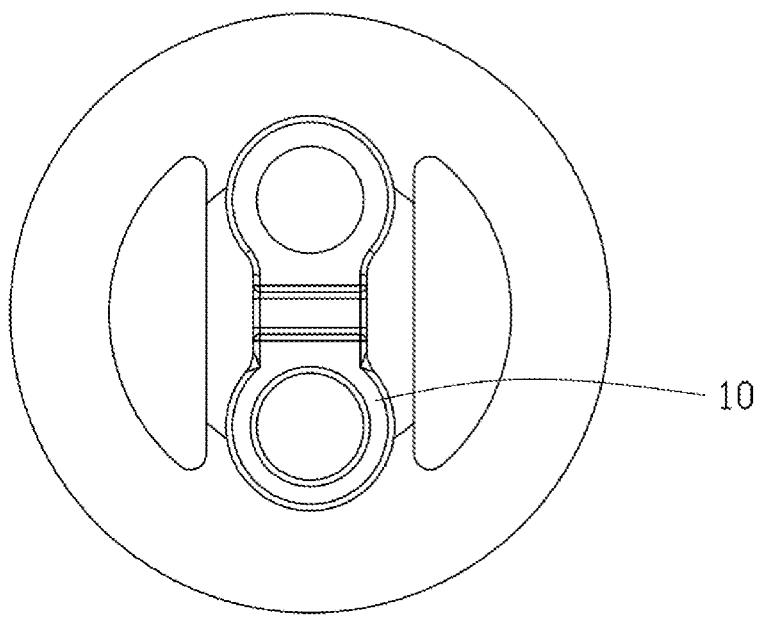
FIG. 10 is a left side structural schematic diagram of a heat dissipation flange ceramic sleeve of a silicon nitride ceramic heating and ignition device for granular fuel barbecue oven according to the present disclosure.
Figure 11:
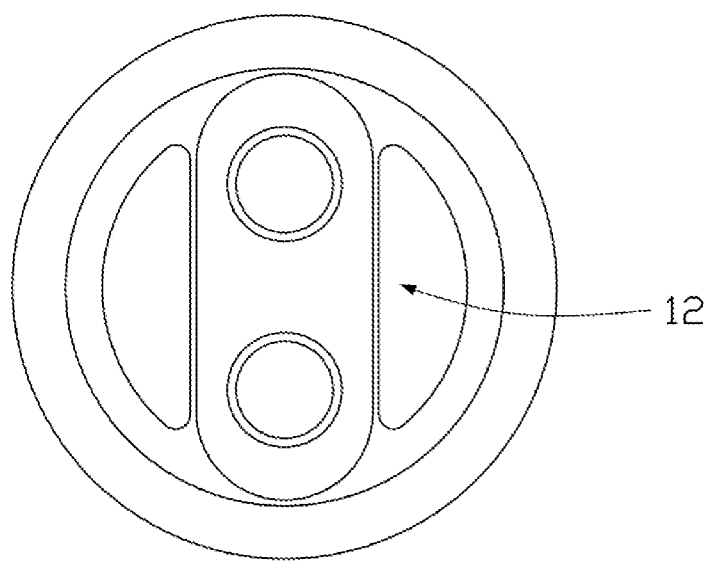
FIG. 11 is a right side structural schematic diagram of a heat dissipation flange ceramic sleeve of a silicon nitride ceramic heating and ignition device for granular fuel barbecue oven according to the present disclosure.
Figure 12:
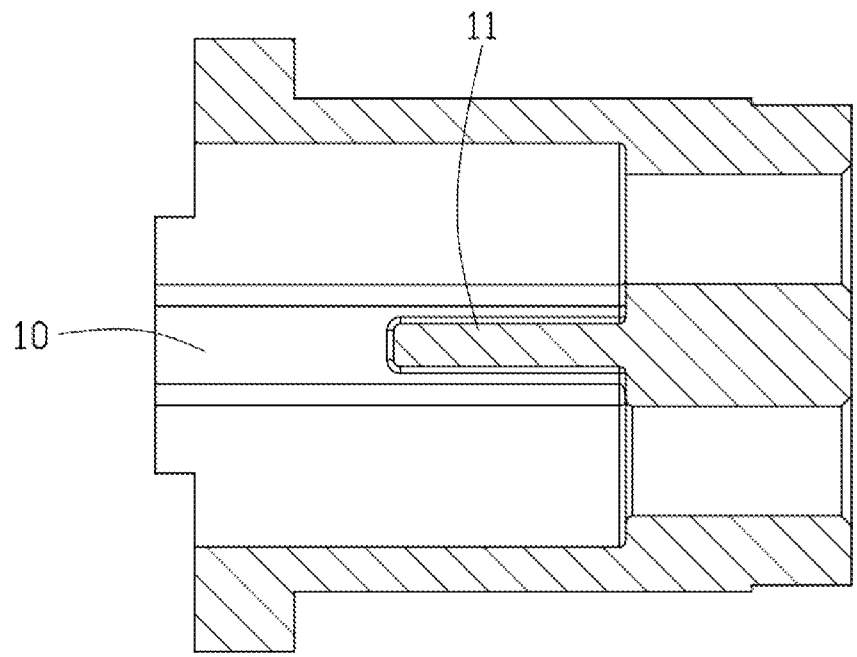
FIG. 12 is a cross-sectional structural schematic diagram of FIG. 9.
Figure 13:
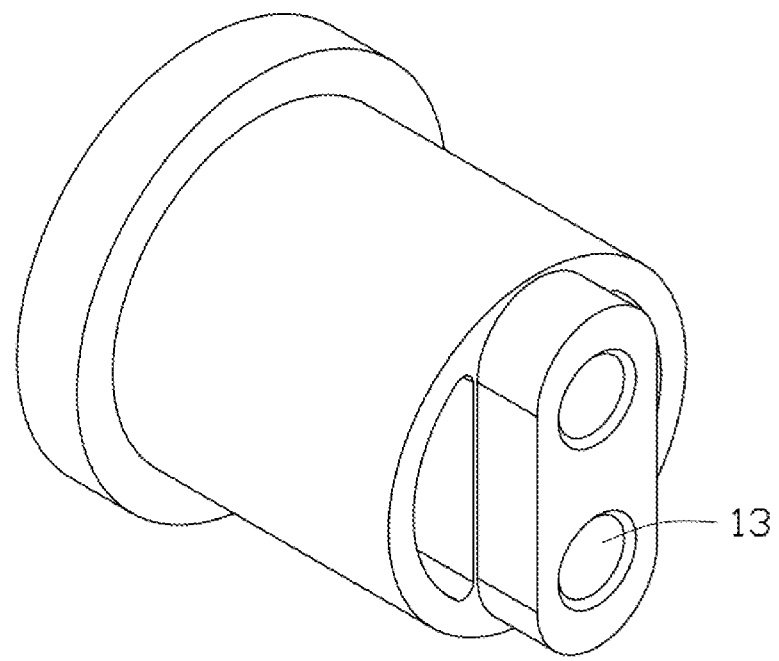
FIG. 13 is a three-dimensional structural schematic diagram of a heat dissipation flange ceramic sleeve of a silicon nitride ceramic heating and ignition device for granular fuel barbecue oven according to the present disclosure.
Figure 14:
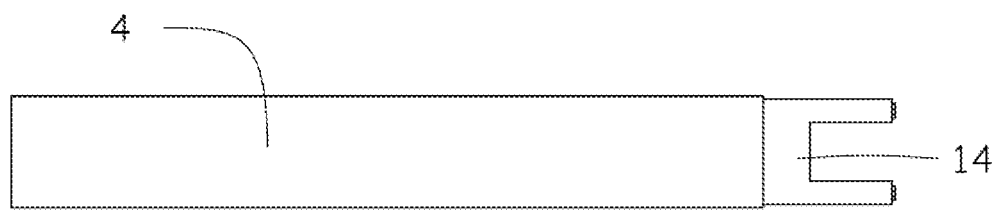
FIG. 14 is a structural schematic diagram of a silicon nitride ignition rod in a silicon nitride ceramic heating and ignition device for granular fuel barbecue oven according to the present disclosure.
Figure 15:
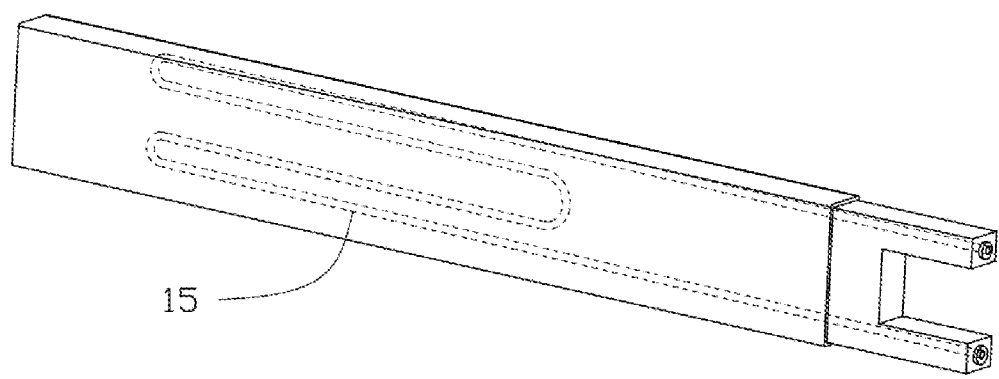
FIG. 15 is a structural schematic diagram of a molybdenum wire inside a silicon nitride ignition rod in a silicon nitride ceramic heating and ignition device for granular fuel barbecue oven according to the present disclosure.
Figure 16:
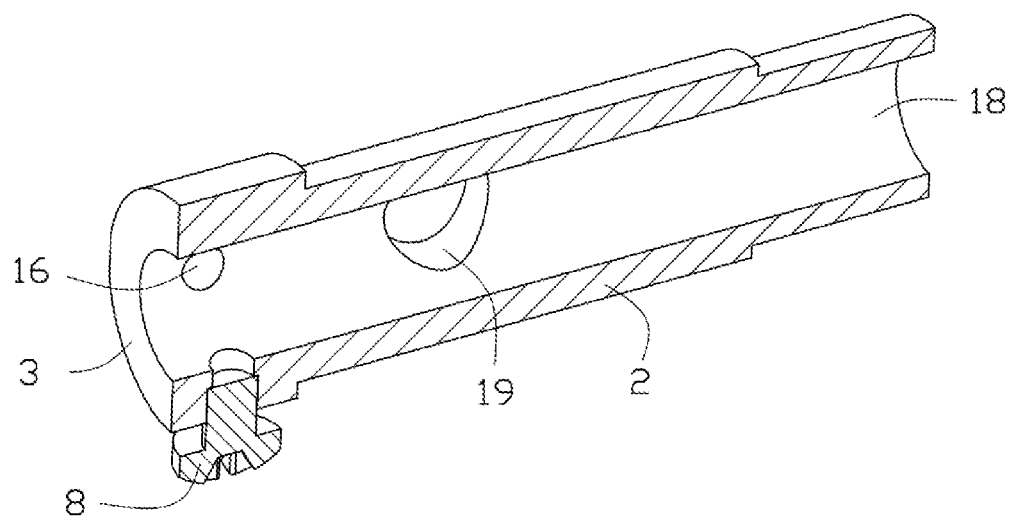
FIG. 16 is a cross-sectional structural schematic diagram of a fixing pipe and a flange port in a silicon nitride ceramic heating and ignition device for granular fuel barbecue oven according to the present disclosure.
Figure 17:
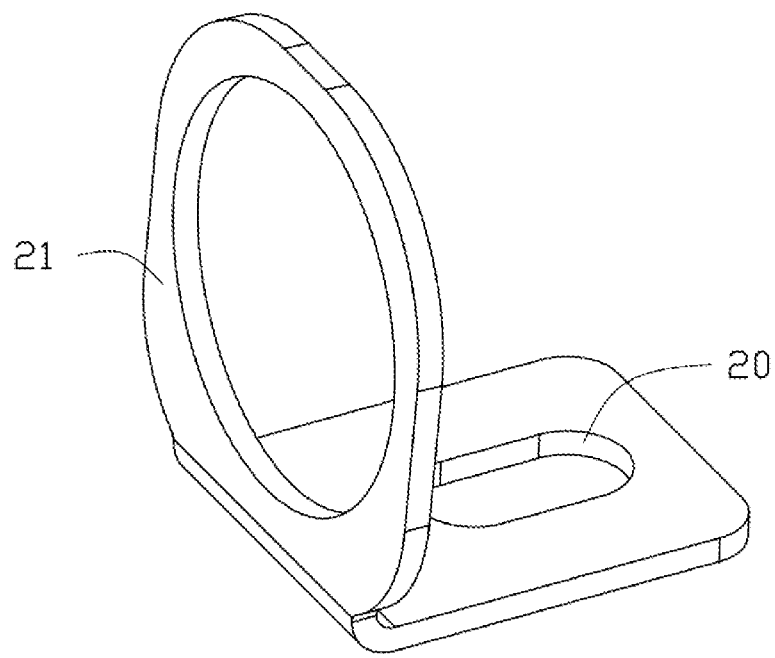
FIG. 17 is a structural schematic diagram of a stainless steel sheet bending support in a 110 V silicon nitride ceramic heating and ignition device for granular fuel barbecue oven according to the present disclosure.
Figure 18:
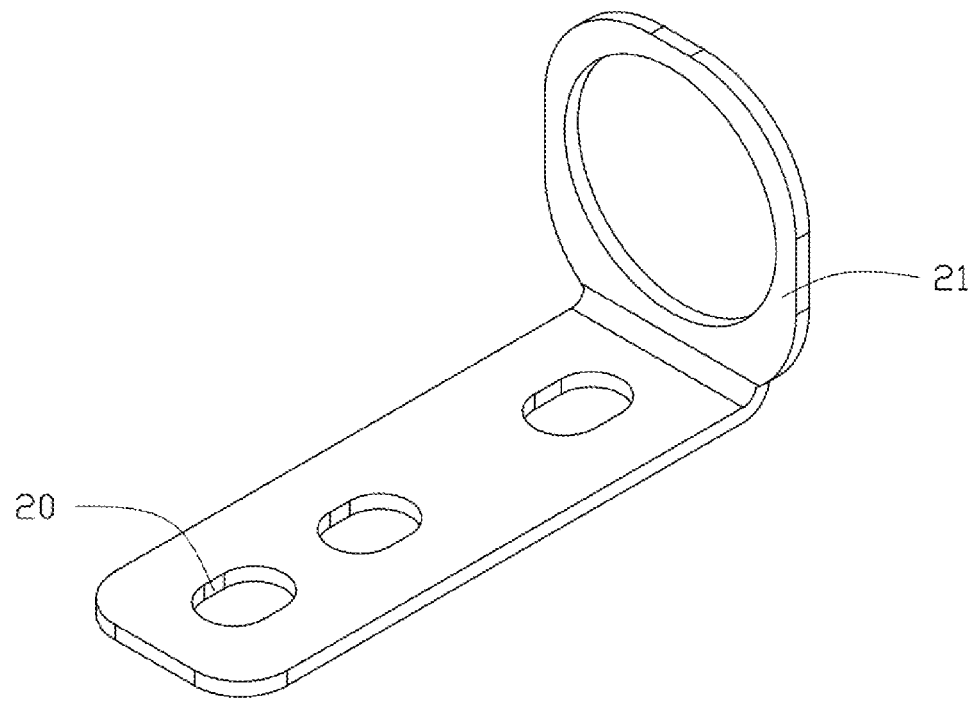
FIG. 18 is a structural schematic diagram of a stainless steel sheet bending support in a 230 V silicon nitride ceramic heating and ignition device for granular fuel barbecue oven according to the present disclosure.
Figure 19:
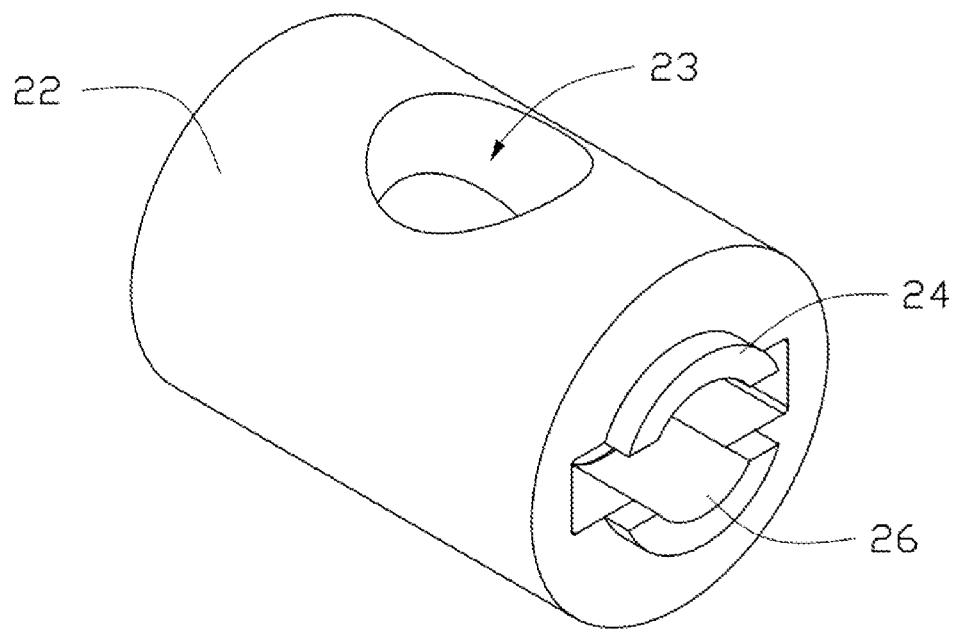
FIG. 19 is a structural schematic diagram of a silicon nitride ceramic heating and ignition device for granular fuel barbecue oven according to the present disclosure.
Figure 20:
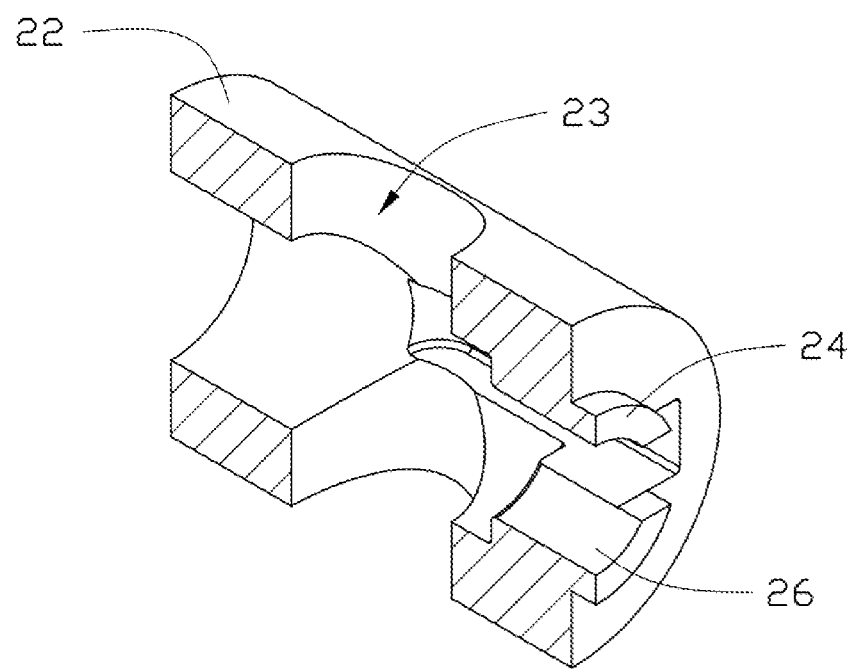
FIG. 20 is a cross-sectional structural schematic diagram of FIG. 19.

Reference number in the figures: combustion chamber 1, fixing pipe 2, flange port 3, silicon nitride ignition rod 4, heat dissipation flange ceramic sleeve 5, stainless steel sheet bending support 6, lead-out wires 7, fixing screws 8, connecting boss 9, positioning groove 10, isolation sheet 11, heat dissipation through hole 12, wire passing hole 13, U groove 14, molybdenum wire 15, threaded hole 16, flange 17, air inlet holes 18, air circulation hole 19, kidney-shaped hole 20, flange fixing hole 21, heat dissipation ceramic connecting sleeve 22, air inlet holes 23, connecting boss 24, stainless steel sheet bending support 25, air circulation hole 26.

DETAILED DESCRIPTION

Specific embodiments of the present disclosure are further described in conjunction with accompanying drawings.

As shown in the drawings, a silicon nitride ceramic heating and ignition device for granular fuel barbecue oven, of 110V structure, includes a combustion chamber 1 and a fixing pipe 2. An outer wall of the combustion chamber 1 and a first end of the fixing pipe 2 are welded into a whole. An inner hole of the fixing pipe 2 is communicated with an interior of the combustion chamber 1, a flange port 3 is fixedly connected to a second end, distal from the combustion chamber 1, of the fixing pipe 2. One end of the flange port 3 is configured to mount and connect a heat dissipation flange ceramic sleeve assembly and a silicon nitride heating rod 4. In the heat dissipation flange ceramic sleeve assembly, two connection bosses 9 are disposed on a positioning connection of the heat dissipation flange ceramic sleeve 5, and the two connection bosses 9 are symmetrically distributed and positioned at the flange port 3 of the fixing pipe 2. An outer diameter of another end fixing flange 17 of the heat dissipation flange ceramic sleeve 5 is sleeved in a flange fixing hole 19 of the stainless steel sheet bending support 6. A silicon nitride ignition rod 4 is bonded to an inner wall of the heat dissipation flange ceramic sleeve assembly. Lead-out wires 7 are led out from one end of the silicon nitride ignition rod 4 through a wire hole of the heat dissipation flange ceramic sleeve. A heat dissipation through hole 12 of the heat dissipation flange ceramic sleeve and the through hole of the fixing pipe 2 form a flow channel cavity to extend into the combustion chamber 1. A side face of the heat dissipation flange ceramic sleeve 5 connected to the flange port 3 is connected to a fixing screw 8. The fixing screw 8 may fix a kidney-shaped hole 20 of the stainless steel sheet bending support 6, making the heat dissipation flange ceramic sleeve 5 form an integral silicon nitride ceramic heating rod structure. A 230V structure has a 110V structure, in addition, adds a heat dissipating ceramic connecting sleeve 22, and replaces the silicon nitride ignition rod 4 and the stainless steel sheet bending support 25. Similarly, in the 230V structure, the heat dissipation through hole 12 of the heat dissipation flange ceramic sleeve, the air inlet holes 23 and the air circulation hole 26 of the heat dissipation ceramic connection sleeve, and the through hole of the fixing pipe 2 form a flow channel cavity and extend into the combustion chamber 1.

In the embodiment, the silicon nitride ignition rod 4 is formed by pressing special silicon nitride special formula powders. Under a vacuum high-pressure state, the heating molybdenum wire 15 material and silicon nitride are directly sintered into a whole through a high temperature of 1780 degrees Celsius, so that the silicon nitride ignition rod has excellent thermal conductivity, oxidation resistance, electrical insulation performance in a high-temperature state, low thermal expansion coefficient, and corrosion resistance of acid, alkali and salt. The silicon nitride ignition rod has advantages of maintaining strength of room temperature at 1200 degrees Celsius, etc. Heating power of the silicon nitride ignition rod may be set higher, and the good thermal conductivity effectively increases ignition temperature and shortens ignition time. In addition, the silicon nitride ignition rod 4 may well fix the heating molybdenum wire 15 in a middle of the silicon nitride ignition rod 4, and the silicon nitride ignition rod 4 is fixed in the air circulation hole 18 of the fixing pipe 2 through the fixing connecting boss 9 of the heat dissipation flange ceramic sleeve, so that shaking is avoided. An outer surface of the heat dissipation flange ceramic sleeve assembly, the heat dissipation through hole 12, the air inlet holes on two sides of the fixing pipe 2 and the inner air circulation hole 18 increase surface heat dissipation area, and the inner cavity rapidly flows into the combustion chamber under an air flow propulsion condition, so that the lead-out wires 7 are in a better working environment, and the service life is prolonged. A sealing performance of the heating molybdenum wire 15 element and the silicon nitride in the silicon nitride ignition rod 4 after sintering is further improved, so that the silicon nitride ignition rod may be stored in an outdoor and humid environment. Good corrosion resistance of acid, alkali and salt enables the silicon nitride ignition rod to withstand corrosion of oil, salt and various organic substances produced by food during grilling, and the silicon nitride ignition rod is easier to clean.

In order to achieve a purpose of high insulativity, the device adopts following technical scheme: two lead-out wires 7 are welded at one end of the silicon nitride ignition rod 4, a U groove 14 is defined between the two lead-out wires 7, an inner hole of the heat dissipation flange ceramic sleeve 5 passes through the positioning groove 10 to an inner end of the isolation sheet 11, and two walls of the isolation sheet 11 abut against an inner wall end of the U groove 14. The two lead-out wires 7 pass through a wire passing hole 13 of the heat dissipation flange ceramic sleeve 5, extend to an outside of the heat dissipation flange ceramic sleeve 5. The silicon nitride silicon ignition rod 4 is limited by the positioning groove 10 to rotate the two lead-out wires 7 to be separated by the isolation sheet 11, so that the two lead-out wires 9 are not in contact with each other, and the insulation performance of the device is improved. The positioning groove 10 and two heat dissipation through holes are disposed in the inner wall of the heat dissipation flange ceramic sleeve 5. The U groove 14 at one end of the silicon nitride ignition rod 4 abuts against one end of the isolation sheet 11 of the heat dissipation flange ceramic sleeve 5, so that space inside the flange ceramic sleeve 5 is divided into two parts, the two lead-out wires 9 are in two different spaces, and the insulation performance is further improved.

In order to achieve good sealing performance and adapt to outdoor or humid environments, the device adopts the following technical scheme: when an outer wall of the U groove 14 at one end of the silicon nitride ignition rod 4 and the inner wall of the heat dissipation flange ceramic sleeve 5 are bonded through a high-temperature homogeneous solid adhesive, the solid adhesive may be filled in a gap between the heat dissipation flange ceramic sleeve 5 and the U groove 14 at one end of the silicon nitride ignition rod 4, so that the solid adhesive is squeezed down to insides of the gaps between the grooves, and the solid adhesive may be attached to the inner wall of the U groove 14 at one end of the silicon nitride ignition rod 4 and the inner wall of the heat dissipation flange ceramic sleeve 5. When the solid adhesive is solidified, liquid becomes solid, a distance between molecules is reduced, attraction force between the molecules increases, and the gap between the silicon nitride ignition rod 4 and the heat dissipation flange ceramic sleeve 5 is filled. Compared with the 110V structure, the 230 V structure increases the heat dissipation ceramic connecting sleeve 22. When the solid adhesive is solidified, a gap does not occur, sealing property is increased, or a situation that adhesion is not firm is avoided, so that excellent sealing performance is achieved between the silicon nitride ignition rod 4 and the heat dissipation flange ceramic sleeve 5, and the products may be stored in the outdoor and humid environment.

In order to achieve the purpose of fixing the silicon nitride ignition rod 4 firmly, the device adopts the following technical scheme: a threaded hole 16 is defined on an outer side of the flange port 3, so that the connection bosses 9 are disposed on one end of the connection of the heat dissipation flange ceramic sleeve 5, and the two connection bosses 9 are symmetrically distributed up and down and positioned at the flange port 3. The stainless steel sheet bending support 6 (the 230V structure adopts a stainless steel sheet bending support 25) may fix the fixing screw 8 after the flange fixing hole 21 is adjusted.

A working principle and an using process of the present disclosure are as follows: when the whole device is assembled, due to a fact that the connecting boss 9 in the heat dissipation flange ceramic sleeve and the connecting boss 24 of the 230 V structure may well prevent the shaking of the silicon nitride ignition rod 4, the outer wall flange 17 of the heat dissipation flange ceramic sleeve 5 is fixed on the flange fixing hole 21 of the stainless steel sheet bending support 6 and the connecting boss 24. The other end waist-shaped hole 20 of the stainless steel sheet bending support is connected to the flange port 3 of the fixing pipe 2. The silicon nitride ignition rod 4 may fill gaps between the heat dissipation flange ceramic sleeve 5 and others, so that the solid adhesive is squeezed down to insides of the gaps between the grooves. When the solid adhesive is solidified, the liquid becomes the solid, the distance between molecules is reduced, the attraction force between the molecules increases, and the gap between the silicon nitride ignition rod 4 and the heat dissipation flange ceramic sleeve 5 is filled. When the solid adhesive is solidified, no gap exists, no sealing or sticking is caused, and excellent sealing performance is achieved between the silicon nitride ignition rod 4 and the heat dissipation flange ceramic sleeve 5. Due to the fact that the two lead-out wires 7 at one end of the silicon nitride ignition rod 4 are separated by the isolation sheet 11 through the wire passing holes 13, the two lead-out wires 7 cannot be in contact with each other, the insulation performance of the device is improved. When the silicon nitride ignition rod 4 is installed, the heat dissipation flange ceramic sleeve 5 is inserted into the positioning groove 10 and abuts against the clamping groove 11 at one end of the silicon nitride ignition rod 4, so that the space inside the heat dissipation flange ceramic sleeve 5 is divided into two parts. The two lead-out wires 7 are respectively located in two different spaces, so that the insulation performance is further improved. After completion, the silicon nitride ignition rod 4 is electrified to ignite the combustion of biomass particles, thereby realizing barbecue processing on food.

It should be noted that the above is merely a preferred embodiment and applied technical principles of the present disclosure. People skilled in art will understand that the present disclosure is not limited to the specific embodiments described herein. Various obvious changes, readjustments and substitutions may be made to the people skilled in the art without departing from a protection scope of the present disclosure. Therefore, although the present disclosure has been described in more detail through the above embodiments, the present disclosure is not limited to the above embodiments. Without departing from concept of the present disclosure, more other equivalent embodiments may be included, and the scope of the present disclosure is determined by the scope of appended claims.

What is claimed is:

1. A silicon nitride ceramic heating and ignition device for a granular fuel barbecue oven, comprising:
    a combustion chamber; and
    a fixing pipe;
    wherein an outer wall of the combustion chamber and a first end of the fixing pipe are fixed together as a whole, the fixing pipe is communicated with an interior of the combustion chamber to form a heat flow channel;
    a flange port of a second end of the fixing pipe, distal from the combustion chamber, is connected with a heat dissipation ceramic connection sleeve and a heat dissipation flange ceramic sleeve assembly;
    a heat dissipation ceramic flange sleeve of a first end of the beat dissipation flange ceramic sleeve assembly and a flange port of the second end of the fixing pipe are connected with a boss positioning center;
    a silicon nitride ignition rod is bonded to an inner wall of a second end of the heat dissipation flange ceramic sleeve assembly, a wiring end of the silicon nitride ignition rod are connected to two lead-out wires, the two lead-out wires penetrate through wire passing holes of the heat dissipation flange ceramic sleeve, heat dissipation through holes are defined between the silicon nitride ignition rod, the heat dissipation flange ceramic sleeve assembly, and the fixing pipe,
    one end of the silicon nitride ignition rod extends into an interior of the combustion chamber, and the heat dissipation flange ceramic sleeve and the flange port are fixed on a stainless steel sheet bending support through fixing screws;
    wherein threaded holes are defined at two positions of the flange port of one end of the fixing pipe where the two positions are at 90 degrees to each other,
    an inner cavity wall of a connecting head is matched and positioned with two symmetrically distributed concave-convex boss sliding grooves of ends of the heat dissipation flange ceramic sleeve assembly,
    the connecting head is fixed with the stainless steel sheet bending support through a fixing screw, and an outer wall of the fixing screw is compressed on the stainless steel sheet bending support;
    wherein an adjustable waist hole is fixedly connected to the stainless steel sheet bending support.

2. The silicon nitride ceramic heating and ignition device for the granular fuel barbecue oven according to claim 1, wherein the lead-out wires are respectively welded to the two lead welding ends of the silicon nitride ignition rod, the lead-out wires are welded to two side ends of a U groove defined in the silicon nitride ignition rod, a first isolation sheet is disposed in a middle of an inner side of the heat dissipation flange ceramic sleeve to form a fixed isolation area, a wall body of the isolation sheet is matched and connected with a wall of the U groove of the silicon nitride ignition rod, and the lead-out wires penetrate through the heat dissipation flange ceramic sleeve and extend to an exterior of the heat dissipation flange ceramic sleeve.

3. The silicon nitride ceramic heating and ignition device for the granular fuel barbecue oven according to claim 2, wherein a positioning groove and a second isolation sheet are defined in a middle of an inner wall of the heat dissipation flange ceramic sleeve, an upper end and a lower end of the positioning groove are configured to position a body of the silicon nitride ignition rod, and an inner wall of the U groove of the silicon nitride ignition rod is inserted into the isolation sheet to locate and isolate the lead-out wires.

4. The silicon nitride ceramic heating and ignition device for the granular fuel barbecue oven according to claim 3, wherein semi-circular bodies at two ends of the silicon nitride ignition rod penetrate through convex bodies of the lead-out wires.

5. The silicon nitride ceramic heating and ignition device for the granular fuel barbecue oven according to claim 3, wherein the isolation sheet is inserted into the positioning groove disposed in the inner wall of the heat dissipation flange ceramic sleeve and abuts against the U groove at one end of the silicon nitride ignition rod.

6. The silicon nitride ceramic heating and ignition device for the granular fuel barbecue oven according to claim 2, wherein the inner wall of the heat dissipation flange ceramic sleeve is bonded with the silicon nitride ignition rod through a high-temperature homogeneous solid adhesive, which is configured to fill solid glue in a gap between the heat dissipation flange ceramic sleeve and the silicon nitride ignition rod.

7. The silicon nitride ceramic heating and ignition device for the granular fuel barbecue oven according to claim 1, wherein the heat dissipation flange ceramic sleeve and a flange small end of the heat dissipation ceramic connecting sleeve are configured to fix and connect the stainless steel sheet bending support,
    a positioning protrusion part of a flange large end is connected with an inner hole of the flange port of one end of the fixing pipe to combine into a whole.

8. The silicon nitride ceramic heating and ignition device for the granular fuel barbecue oven according to claim 7, wherein a flange part of an outer surface of the heat dissipation flange ceramic sleeve assembly and the two heat dissipation through holes increase a heat dissipation area of the outer surface of the heat dissipation flange ceramic sleeve assembly, a hot air flow is rapidly pushed to the combustion chamber through the two heat dissipation through holes.

* * * * *